United States Patent Office 3,499,603
Patented Mar. 10, 1970

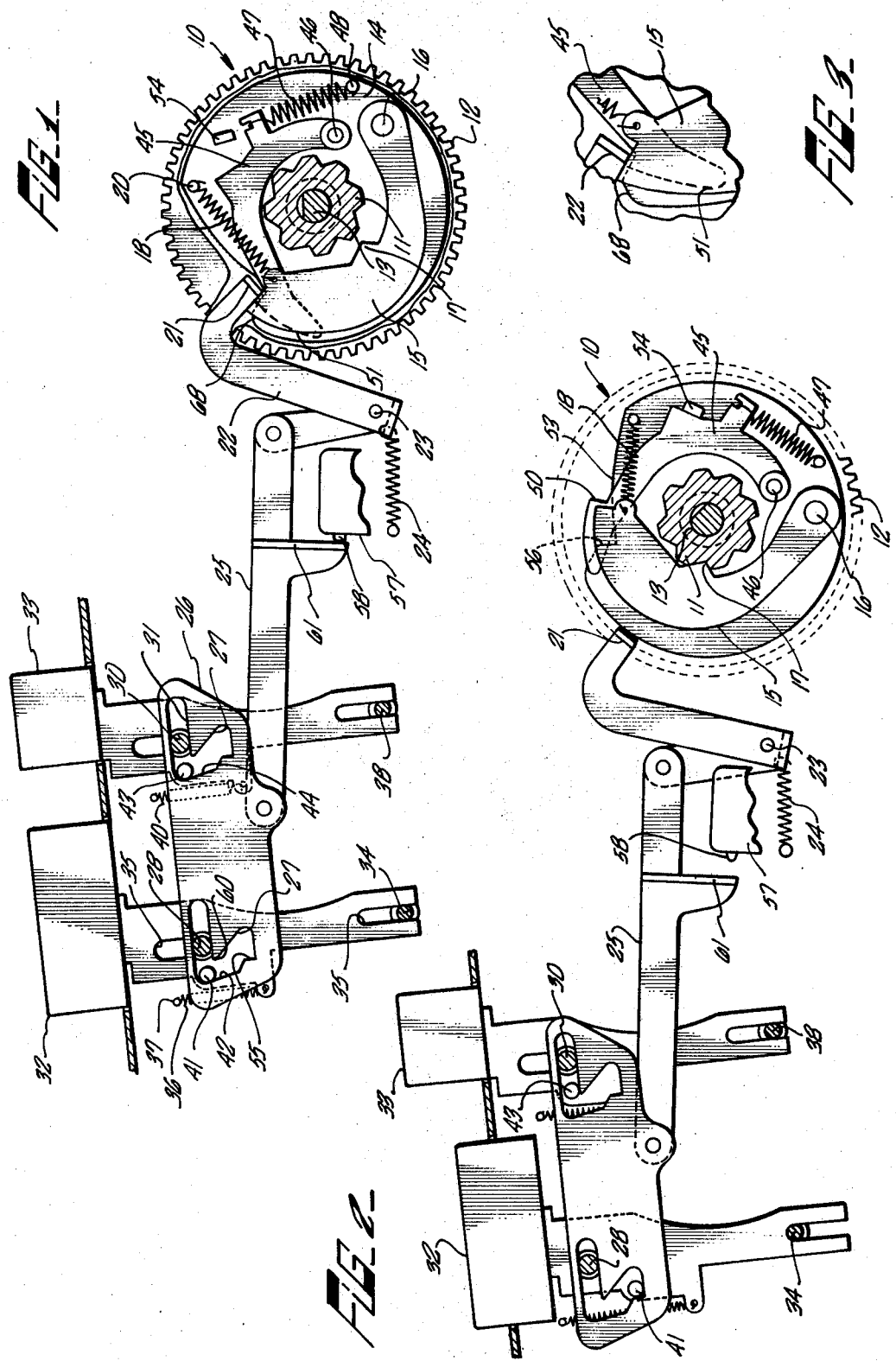

3,499,603
CONTROL MECHANISM FOR CALCULATING MACHINES
Richard E. Busch, La Puente, Calif., assignor to Addmaster Corporation, San Gabriel, Calif., a corporation of California
Filed Apr. 29, 1968, Ser. No. 724,838
Int. Cl. G06c 7/02, 23/00
U.S. Cl. 235—145                                    5 Claims

ABSTRACT OF THE DISCLOSURE

Means for reducing the key pressure required to initiate operation of a motor driven calculating machine having a cyclically operable drive clutch which comprises a spring pressed power member pivotally supported by a driven element of the clutch, the power member including a latching shoulder normally engaging a key operated clutch control member and a camming section effective upon initial movement of the clutch control member toward clutch engaging position to urge the latter through the remainder of its stroke.

---

The invention relates to a motor driven calculating machine, such as an adding-listing machine, and has particular reference to means for reducing the force required to depress a calculation control key.

The principal object of the present invention is to produce a simple and reliable device for reducing the force necessary to depress any operation initiating and controlling key.

Another object is to reduce shocks incurred in arresting the driven part of a cyclic clutch at the end of a cycle of operation.

The manner in which the above and other objects of the invention are accomplished will be readily understood on reference to the following specification when read in conjunction with the accompanying drawings, wherein:

FIG. 1 is a sectional view through part of the controls of an adding-listing machine, embodying a preferred form of the present invention.

FIG. 2 is a sectional view similar to FIG. 1 but showing the main clutch engaged and rotated partly through its cycle.

FIG. 3 is an enlarged fragmentary view of part of the clutch.

The particular embodiment of the invention disclosed herein is adapted to the well-known commercially available Addmaster Adding Machine whose various operating instrumentalities are basically disclosed in the R. E. Busch Patent No. 3,113,719, issued on Dec. 10, 1963, and the H. L. Clary et al. Patent No. 3,132,582, issued on May 12, 1964. Accordingly, for the sake of brevity, reference is hereby made to such patents for an understanding of the details of mechanism not specifically disclosed herein. However, it should be understood that the invention is applicable to other types of calculating machines or the like embodying key-controlled power driven mechanisms.

The machine embodies a cyclically operable clutch generally indicated at 10. The latter comprises a toothed ratchet wheel 11 integral with a drive gear 12 which is driven by a motor (not shown) through a suitable gear train. The ratchet wheel is rotatably mounted on a main driven shaft 13 to which a driven clutch disc 14 is suitably attached.

A clutch pawl 15 is pivotally supported at 16 on the disc and has a tooth 17 engageable with any of the teeth on the ratchet wheel 11 to form a driving connection for the shaft 13. The pawl is urged toward engagement with the ratchet wheel by a tension spring 18 extending between the pawl and a stud 20 on the disc but is normally held in its illustrated disengaged position by an ear 21 formed on a clutch control bail 22. The latter is pivotally supported at 23 and is urged clockwise by a tension spring 24. One arm of the bail 22 is connected through a link 25 to a control slide 26. The latter has two substantially L-shaped slots 27 formed therein. The slide 26 is supported for endwise movement by frame studs 28 and 30 which are embraced by the horizontal sections 31 of the slots 27.

Two depressible control keys 32 and 33 are provided to control add, subtract, subtotal and total functions of the machine. That is, the key 32, upon depression, conditions and initiates operation of the machine to perform an adding operation if, preceding its depression, an amount has been entered into the machine through the usual digit entry keys (not shown). If no amount has been entered, depression of the key 32 will cause a subtotal operation to occur.

The key 33, when depressed, following entry of an amount, will cause a subtract operation, whereas depression of key 33 without previous entry of an amount in the machine will cause a total operation.

Key 32 is guided for vertical movement by frame studs 28 and 34 which are slideably embraced by vertical slots 35 formed in the keystem. A tension spring 36 extending between the keystem and a frame stud 37 normally holds the key in its upper undepressed position shown in FIG. 1. The key 33 is similarly guided for vertical movement by frame studs 30 and 38 and is normally held in its upper illustrated position by a tension spring 40.

A stud 41 on the stem of key 32 extends into engagement with a cam surface 42 forming one edge of the vertical leg of the forward slot 27 and a similar stud 43 on the stem of key 33 extends into engagement with a similar camming surface 44 forming part of the rear slot 27.

According to the present invention, a power assist device is provided which is released upon partial depression of one of the control keys 32 and 33 and is effective to fully move the clutch control bail 22 through its full clutch engaging stroke. Such device comprises an arcuate member 45 which is pivotally supported on a stud 46 mounted on the disc 14. A tension spring 47 extending between the lever 45 and a stud 48 on the disc 14 urges the lever clockwise to normally hold a latching shoulder 50 on the lever against the lower edge of the bail ear 21.

It will be noted that the shoulder 50 extends substantially at right angles to a line passing through the pviot 23 when the clutch is in its full cycle position. Also, it will be noted that the ear 21, when moved leftward to cause engagement of the clutch, moves generally along a line which extends close to the axes of the pivots 16 and 46 so that the shoulder 50 does not tend to cam the bail 22 out of clutch disengaging position. However, when the bail 22 has been moved through approximately one-third of its full stroke, the ear 21 moves off of the shoulder 50 whereupon the lever 45 is moved clockwise by spring 47 to carry the camming surface 51 under the ear 21. Such camming surface is so formed that it will cam the bail 21 outward against the action of its spring 24 to release the pawl 15 for engagement with the ratchet wheel and to carry the ear 21 beyond a stop shoulder 56 on the disc 14. At this time, the lever 45 will arrest against a stop 54 on the disc 14. As the bail 22 is moved counterclockwise, the slide 26 will be moved leftwardly causing a camming surface 60 to strike the stud, i.e. 41, of the depressed key and cam the same throughout the remainder of its stroke. As the side 26 reaches its leftmost position, the horizontal portion 31 of one of the slots 27 embraces the stud, i.e. 43, of the undepressed key, thus blocking depression of such key until the current cycle has been completed.

Under normal conditions, the stop shoulder 56 does not engage the ear 21. However, an inclined shoulder 68 on the disc 14 may positively cam the control bail 22 to the outer limit of its stroke in the event it is not moved to such position by the power lever 45.

Toward the end of a cycle, during which a depressed key has been released, the ear 21 will ride along the outer periphery of the disc 14 and will engage the shoulder 50, thereby returning it to its position shown in FIG. 1, and thereafter, the ear 21 will engage the pawl 15 to release the same from the ratchet wheel. As the clutch becomes disengaged, the spring 47 tends to gradually decelerate the shaft 13 and machine elements connected thereto and thus reduces the shock of arresting the shaft in full cycle position. A centralizer camming device (not shown) is provided to yieldably maintain the shaft in full cycle position.

In view of the above noted power device, the major portion of a key stroke may be utilized to advance the clutch control bail 21 through only a small portion of its full stroke necessary to safely control the clutch pawl. Therefore, the camming surfaces 42 and 44 are arranged at a very low camming angle and extend approximately three-fourths of the key travel, permitting an extremely light key depressing force to effect engagement of the clutch and actuation of any machine conditioning mechanisms which may be connected to the keys or to slide 26.

A normally open switch 57 is located in the motor circuit. The switch is of conventional construction and has a plunger 58 engageable by an ear 61 on the link 25. When the link 25 is moved to the left under the impetus of the power lever 45, the switch will close, causing operation of the motor.

As the camming surface 51 cams the bail 22 beyond the position to which it is moved by slide 26, the camming surface, i.e. 42, is moved beyond the stud, i.e. 41, of the associated depressed key, locating a vertical dwell surface 55 to the left of such stud. Thus, if at this time the operator holds the key depressed, the stud will prevent retraction of the slide and the bail 22 so as to maintain continuous multi-cyclic operation of the clutch.

Having thus described the invention, what is claimed and desired to be secured by United States Letters Patent is:

1. In a calculating machine having a rotary drive means, rotary driven means, a clutch adapted to connect said drive means to said driven means, said clutch comprising,
   a toothed member rotatable by said drive means,
   a driven member operatively connected to said driven means,
   a pawl supported by said driven member, and
   spring means urging said pawl toward engagement with said toothed member;
   a clutch control member normally in a first position in latching engagement with said pawl for maintaining said pawl out of engagement with said toothed member,
   control means for moving said control member to a second position to release said pawl,
   a power member supported by said driven member,
   spring means urging said power member against said control member,
   said power member having a latching shoulder and actuating means thereon,
   said latching shoulder engaging said control member when said control member is in latching engagement with said pawl, and
   said actuating means engaging said control member upon movement of said control member a predetermined amount toward said second position whereby to thereafter urge said control member toward said second position.

2. The structure recited in claim 1 wherein said actuating means comprises a camming section adapted to cam against said control member.

3. The structure recited in claim 1 comprising means pivotally supporting said power member on said driven member,
   said latching shoulder extending at least substantially parallel to the direction of movement of said clutch control member when said clutch is disengaged.

4. The structure according to claim 1 wherein said control means comprises a depressible key movable through a predetermined stroke, and
   camming means operable by said key for actuating said clutch control member,
   said camming means being effective to release said clutch control member from said latching shoulder upon movement of said key through the major portion of said stroke.

5. The structure recited in claim 1 wherein said control means comprises a depressible key movable through a predetermined stroke, and
   camming means operable by said key for actuating said clutch control member, said camming means being effective to release said clutch control member from said latching shoulder upon movement of said key through the major portion of said stroke,
   said camming means including a dwell portion effective during the remainder of said stroke.

References Cited
UNITED STATES PATENTS

| 3,042,300 | 7/1962 | Anderson | 235—62 |
| 3,092,315 | 6/1963 | Toorell | 235—62 |
| 3,315,889 | 4/1967 | Thevis | 235—145 |

STEPHEN J. TOMSKY, Primary Examiner

U.S. Cl. X.R.

235—62